T. J. MENTEN.
RETAINER FOR INDICATOR RECORD CHARTS.
APPLICATION FILED SEPT. 29, 1920.
1,414,296.
Patented Apr. 25, 1922.
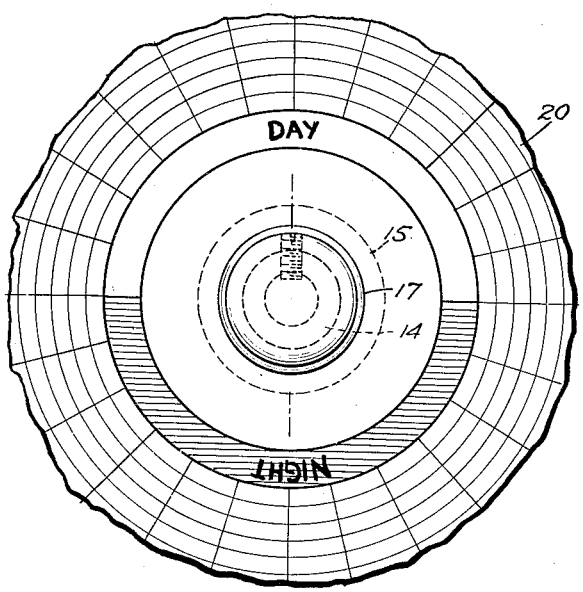
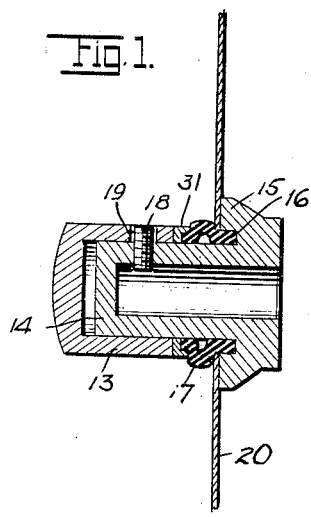
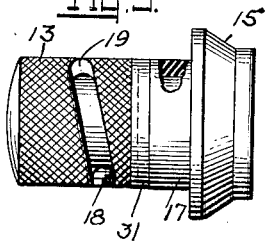
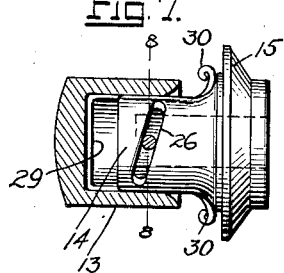
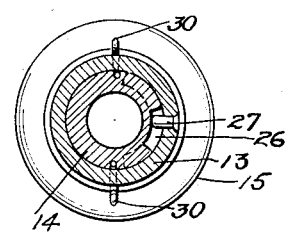
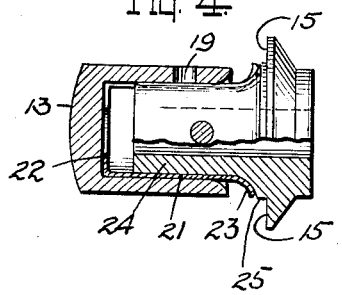
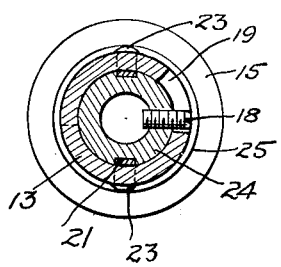
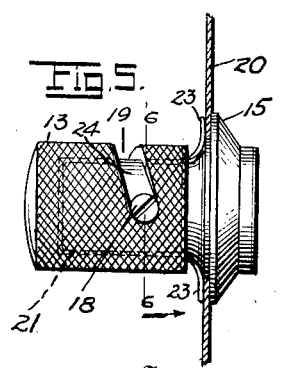
Inventor
THEODORE J. MENTEN
By his Attorney

UNITED STATES PATENT OFFICE.

THEODORE J. MENTEN, OF BROOKLYN, NEW YORK.

RETAINER FOR INDICATOR RECORD CHARTS.

1,414,296.   Specification of Letters Patent.   Patented Apr. 25, 1922.

Application filed September 29, 1920. Serial No. 413,606.

*To all whom it may concern:*

Be it known that I, THEODORE J. MENTEN, a citizen of the United States, and a resident of the city of New York, borough of Brooklyn, in the county of Kings and State of New York, have invented certain new and useful Improvements in Retainers for Indicator Record Charts, of which the following is a full, clear, and exact description.

Among the principal objects which the present invention has in view are: to avoid the loss of the instrument provided for holding the chart in service; to avoid removing the retaining device from the mechanism with which it is connected; to maintain an appearance of neatness; and to simplify the construction of the retainer.

*Drawings.*

Figure 1 is a sectional view showing a retainer, constructed and arranged in accordance with the present invention, of a record chart, and a fragment of a record chart, in service therewith.

Figure 2 is a face view of the retainer and fragment of the chart.

Figure 3 is a side view of the retainer, dissociated from the chart and showing the retainer in its inoperative position.

Figure 4 is a section of a retainer, constructed in accordance with the modified form of the invention.

Figure 5 is a side view of the same showing the retainer in conjunction with a fragment of a record chart and in active operative relation thereto.

Figure 6 is a cross section of the retainer, section being taken as on the line 6—6 in Fig. 5.

Figure 7 is a side view of a retainer, a portion thereof being shown in section disclosing a further modification in form of the invention.

Figure 8 is a cross section of the same, section being taken as on the line 8—8 in Fig. 7.

*Description.*

The employment for which retainers, constructed and arranged in accordance with the present invention, and particularly designed for holding in service, record charts for continuous record thermometers and pressure recording gauges, where the variation in the temperature or pressure is traced on a chart such as shown for ascertaining the variations in point of time. These charts are usually attached to the hour post of clock mechanisms so that the chart is moved one complete revolution in twenty-four hours. At the end of each twenty-four hours, the chart is removed to be filed for record. At the same time, a new chart is disposed in position to receive the record of a new period of time.

Clock mechanisms have been provided in which the hour post is arranged with a clamping flange or table upon which the inner area of the chart rests. The extremity of the hour post as heretofore, has been provided with a screw thread for engagement by a clamping nut which, when set up, clamps firmly the chart. This nut is removed each time the charts are transferred. The removal of these nuts is somewhat precarious, due to the fact that the nut often eludes the grasp of the operator and falls to the floor with the concomitant danger that it becomes temporarily or permanently lost. Permanent loss is occasioned often times by the fact that the thermometer with which the chart is associated is preferably disposed above an open fret-work radiator or floor plate, the openings in which are sufficient for the passage of the nut.

When the nut is lost, the recording instrument is obviously out of commission, and inconvenience is experienced by the reason that usually the lost part has to be replaced by the manufacturer of the instrument.

It is to overcome this difficulty that the present invention provides a cap 13 which slips over and rotatively engages the auxiliary hour post 14 of the clock mechanism above referred to.

The post 14 when adapted for operation with the improved cap 13, has a table 15 in which an annular groove or recess 16 is provided to hold a rubber collet 17. The collet 17 is sufficiently wide to bulge outwardly as shown best in Fig. 1 of the drawings, when it is compressed across its width. The collet is so compressed whenever the cap 13 is rotated so that the pin or set screw 18 is at the outer end of the inclined slot 19 in which position, the said slot 19 acting in a manner similar to a cam, forces the cap 13 inward upon the collet 17 and upon the wear-ring 31 with which the said collet is provided.

The cap 13 and collet 17 when inactively disposed, and when in condition to receive the chart 20, are shown best in Fig. 3 of the drawings. In this position no resistance is offered to slipping the chart 20 over the collet 17 to rest on the surface of the table 15. While the chart is so held, the operator turns the cap 13 clockwise, while at the same time forcing inward, the cap on to the collet 17, with the result that the collet 17 is bulged outward as shown in Fig. 1 of the drawings. When the upper and outer end of the slot 19 is juxtaposed with the pin 18, the cap is released to be rotated by the pin 18 in the position shown in Fig. 1 of the drawings. Referring to the said figure, it will be noted that the bulge 18 extends over the inner edge of the perforation at the center of the chart 20 and presses the same firmly against the table 15, holding the charge thereover, firmly on the said table, to be rotated when the post 14 is rotated by the clock mechanism.

When it is now desired to remove the chart 20, the operator retractively rotates the cap 13 until the pin 18 rests in the innermost or lower extremity of the slot 19, shown in Fig. 3 of the drawings. Here the collet 17 has resumed, by reason of the resiliency of the material, the original position of the collet, where the outer walls line with the outer wall of the cap 13. The chart on which a record has been made, can now be freely removed and a new chart replaced, as the cap 13 is not removed from its active relation to the mechanism with which associated, no danger of loss thereof exists.

In Figures 4, 5 and 6 of the drawings, a modified form of the invention is shown, the modification consisting in providing a leaf spring 21, the loop 22 whereof, rests against the head of the cap 13, while the lower extremities 23 are bent to fit the curved surface of the post 24 at the base thereof. The curved surface referred to is raised above the table 15 to form a circular shoulder 25. The shoulder 25 is raised about the table 15, the thickness of the chart 20. The diameter of the shoulder 25 is the same as the diameter of the cap 13, so that the opening in the chart 20 fits snugly, the shoulder 25. When now the cap 13 is depressed, the loop 21 is also depressed, forcing outward, the ends or extremities 23 which pass beyond the shoulder 25 above the chart 20 to bear upon the said chart as the loop is spread, and to frictionally hold the chart on the table 15.

The operation of the cap 13 in the modified form described is the same as that above set forth with reference to the preferred form shown in Figures 1 to 3. The modified form of the invention disclosed in Figures 7 and 8, provides a slot 26 in the post 14, and a pin 27 driven through the wall of the cap 13 to enter and operatively engage the slot 26. In this form of the invention, a spring wire loop 29 is substituted for the spring leaf loop 21. The ends of the spring wire loop 29 are over-turned to form the feet 30, the upturned portions whereof avoid crumpling or creasing the chart 20 when being forced into holding engagement therewith.

In all the forms of the invention, it will be noted the cap 13 is held permanently attached to the clock mechanism or to the post 14 thereof, and therefore cannot be accidently detached from the post thereby, temporarily or permanently, becoming lost, while removing or replacing one of the charts 20.

Claims.

1. A retainer as characterized comprising, a post having a laterally extended table; a cap permanently mounted on said post and movable toward and away from said table; means for holding said cap in positions juxtaposed to, or retracted from, said table; and an expansible member interposed between said cap and said table for extension over said table when said cap is moved toward said table.

2. A retainer as characterized comprising, a post having a laterally extended table; resilient means mounted on said post for extension over said table when compressed lengthwise of said post; and means permanently mounted on said post for compressing said resilient means.

3. A retainer as characterized comprising, a post having a laterally extended table; means permanently mounted on said post and movable lengthwise thereof; means for retaining said movable means in adjusted positions on said post, and a laterally expansible member operatively connected with said movable means, to be extended thereby, over said table when moved toward said table.

4. A retainer as characterized comprising, a post having a laterally extended table; a cap rotatively mounted on said post; cam-like means operatively connecting said post and said cap for moving said cap lengthwise of said post, when said cap is rotated thereon; and a resilient collet mounted on said post intermediate said cap and said table for extension over said table.

5. A retainer as characterized comprising, rotary means for supporting a record chart; and a clamping member permanently and operatively connected with said rotary means for holding a chart of the character mentioned, in operative relation to said rotary means, the diameter of said member when inactively disposed being less than the diameter of the central opening in said chart, said member being expansible to a diameter greater than the said opening in said chart when said member is actively disposed.

THEODORE J. MENTEN.